United States Patent [19]
Genovese

[11] Patent Number: 5,526,166
[45] Date of Patent: Jun. 11, 1996

[54] OPTICAL SYSTEM FOR THE CORRECTION OF DIFFERENTIAL SCANLINE BOW

[75] Inventor: Frank C. Genovese, Fairport, N.Y.

[73] Assignee: Xerox Corporation, Stamford, Conn.

[21] Appl. No.: 358,481

[22] Filed: Dec. 19, 1994

[51] Int. Cl.⁶ .................................... G02B 26/08
[52] U.S. Cl. ............................ 359/204; 359/212
[58] Field of Search ................... 359/196, 197, 359/204, 205, 212, 213, 214, 216, 217, 218, 219, 223, 225, 226; 346/103, 108, 109; 348/203, 744, 745, 746, 747; 358/505, 509, 510

[56] References Cited

U.S. PATENT DOCUMENTS

| | | | |
|---|---|---|---|
| 4,390,235 | 6/1983 | Minoura | 350/6.1 |
| 4,474,422 | 10/1984 | Kitamura | 350/6.8 |
| 4,547,038 | 10/1985 | Mori | 359/204 |
| 4,895,790 | 1/1990 | Swanson et al. | 430/321 |
| 4,962,983 | 10/1990 | Watanabe | 359/205 |
| 5,161,040 | 11/1992 | Yokoyama et al. | 359/19 |
| 5,257,048 | 10/1993 | Genovese | 346/160 |
| 5,257,132 | 10/1993 | Ceglio et al. | 359/565 |
| 5,300,962 | 4/1994 | Genovese | 346/108 |

FOREIGN PATENT DOCUMENTS

| | | |
|---|---|---|
| 3248115 | 11/1991 | Japan . |
| 4283717 | 10/1992 | Japan . |
| 6148545 | 5/1994 | Japan . |

OTHER PUBLICATIONS

Frank C Genovese, "Compound Optics for a Raster Output Scanner in an Electrophotographic Printer," *Xerox Disclosure Journal*, vol. 18, No. 1, Jan./Feb. 1993, pp. 87–93.

*Primary Examiner*—Paul M. Dzierzynski
*Assistant Examiner*—Darren E. Schuberg
*Attorney, Agent, or Firm*—Duane C. Basch

[57] ABSTRACT

The present invention is an apparatus for eliminating differential scanline bow in a raster output scanner (ROS) printing system. The apparatus employs a field lens device at the output of a pre-scanning optical assembly in order to direct the laser beams toward the scanning surface, or facet, at a right angle to the scanning surface, thereby eliminating a source of scanline bow.

16 Claims, 4 Drawing Sheets

OPTICAL SYSTEM FOR THE CORRECTION OF DIFFERENTIAL SCANLINE BOW

This invention relates generally to an optical system to be employed in a raster output scanner (ROS) for creating electrostatic latent images, and more particularly to the use of a field lens in a pre-scanning collimator of a multiple beam ROS to eliminate differential scanline bow.

CROSS REFERENCE

The following related application is hereby incorporated by reference for its teachings:

"Multiple Beam Raster Output Scanner Optical System Having Telecentric Chief Rays," T. Fisli et al., application Ser. No. 08/174,917, filed Dec. 29, 1993.

BACKGROUND AND SUMMARY OF THE INVENTION

The present invention is employed in electrophotographic printers where laser scan lines emanating from a multiple beam light source are projected onto a photoconductive surface. In the case of laser printers, facsimile machines, and the like, it is common to employ a raster output scanner (ROS) as a source of energy signals to be imaged on a pre-charged photoreceptor (a photosensitive plate, belt, or drum) for purposes of xerographic printing. The ROS provides at least two laser beams that switch on and off or are modulated in intensity in response to image signals associated with the desired image to be printed as the beams are made to scan across the photoreceptor surface. In the process called charged area development (CAD), the photoreceptor surface is selectively rasterwise discharged by interlaced scan lines in locations to be printed white, to form the desired image on the photoreceptor. In the inverse process known as discharged area development (DAD), locations to be pigmented are selectively discharged instead. The modulation of the laser beams creating the desired latent image on the photoreceptor is provided by digital electronic data signals controlling drivers or modulators associated with the multi-beam laser source. A common technique for scanning the beams across the photoreceptor is to employ a rotating polygon mirror or similar reflective device; the beams emitted from the laser sources are reflected by the mirror facets creating a scanning action that forms interlaced scan lines, or a raster, on the moving photoreceptor surface. Once a latent image is formed on the photoreceptor, it is subsequently developed with marking particles and the developed image is transferred to a copy sheet, as in the well-known process of xerography.

A known rotating polygon multi-beam ROS scanner system is described below, for easier understanding of the technical discussion, in Prior Art FIG. 7. FIG. 7 shows a pair of sagittally offset laser diodes 31 and 32. The beams 41 and 42 emitted by laser diodes 31 and 32 are collimated by collimator 33 which may be a compound design but is shown schematically as the single lens L1 in FIG. 7. A sagittal aperture 34 following the collimator controls the numerical aperture of the collimator, which in turn controls the spot size created by the beams on the photoreceptor. The input cylinder optical element 35 (lens L2) focuses the beams 41 and 42 on the surface of a polygon facet 36 of the rotating polygon. After reflecting from facet 36, beams 41 and 42 pass through the f-Θ lens 37 (lens L3). The main function of the f-Θ lens 37 is to provide focusing in the tangential meridian and control the scan linearity, in terms of uniform spot displacement per unit angle of polygon rotation.

Subsequently, the wobble compensating optical element (WCO) 39 reimages the focused beams 41 and 42 reflected from polygon facet 36 onto the photoreceptor (PR) plane 40 at a predetermined position, independently of the polygon angle error or tilt of the current facet 36. The WCO can consist of a toroidal surface in the F-Θ lens, a postpolygon cylinder mirror or a postpolygon cylinder lens. Such compensation is possible because the focused beams are stationary "objects" for the F-Θ lens 37 and the WCO 39. Although, due to polygon tilt, or wobble, the beams 41 and 42 reflecting from the mirror facets are directed to different positions of the postpolygon optics aperture for each different facet of the rotating polygon, to a good approximation beams 41 and 42 are imaged to the same position on the PR plane 40. It should be appreciated that in Prior Art FIG. 7, the chief rays are not telecentric. That is, the chief exit rays are not parallel with the system axis 38.

Heretofore, a number of patents and publications have disclosed multiple beam, ROS-based recording systems, the relevant portions of which may be briefly summarized as follows:

U.S. Pat. No. 4,390,235 to Minoura, issued Jun. 28, 1983, discloses a multi-beam scanning apparatus for scanning a surface with a plurality of beam spots modulated independently of one another. Included in the system is an anamorphic afocal zoom lens which has the function of changing the angular magnification, resulting in a proportional change in the spot size as well.

U.S. Pat. No. 4,474,422 to Kitamura, issued Oct. 2, 1984, teaches a multibeam optical scanning apparatus employing a collimating portion positioned subsequent to a polygon reflector.

U.S. Pat. No. 5,257,048 to Genovese, issued Oct. 26, 1993, discloses a ROS-based imaging system including a specially designed optical element to facilitate the precise registration of light beams on the surface of a photoreceptor. Similarly, in U.S. Pat. No. 5,300,962, issued Apr. 5, 1994, (and as published in the Xerox Disclosure Journal, Vol. 18, No. 1, pp. 87–93, Jan./Feb. 1993) Genovese discloses a multi-beam ROS providing a plurality of independently controllable, substantially parallel writing beams.

In accordance with the present invention, there is provided a raster output scanner for a printing apparatus, comprising:

a multiple beam light source for emitting a plurality of light beams;

a photoreceptor;

a movable beam reflecting device for scanning each of the plurality of light beams along the photoreceptor;

a pre-scanning optical system for collimating the plurality of light beams and providing the collimated light beam at an angle of incidence normal to an axis of rotation for said reflecting device; and a post-scanning optical system for focusing the light beams onto the photoreceptor.

One aspect of the present invention deals with a basic problem of scanline bow in multiple-beam ROSs, and more particularly differential scanline bow as is commonly found in multiple color printing systems. As used herein, the term scanline bow refers to the deviation from parallel of a pair or plurality of scanlines imaged on the surface of a photoreceptor. This aspect is further based on the recognition that pre-scanning telecentricity alleviates this problem or, more specifically, that multiple beams parallel with a chief optical ray strike the reflecting facet at normal incidence and avoid the creation of hyperbolic beam scan paths as is common in may ROS optical systems. The present technique for alleviating differential scanline bow is directed toward achieving perpendicularity at the scanning surface (i.e., the polygon facet) so as to reduce the scanline bow at the photoreceptor image plane while simultaneously providing a physically shorter prepolygon optical train. The technique described herein is advantageous because it is relatively simple, and inexpensive compared to other approaches designed to eliminate or compensate for differential scanline bow. Moreover, elimination of differential scanline bow allows more beams to be scanned simultaneously thereby enabling higher processing speeds and/or higher resolutions in ROS imaging systems.

Figure 1:
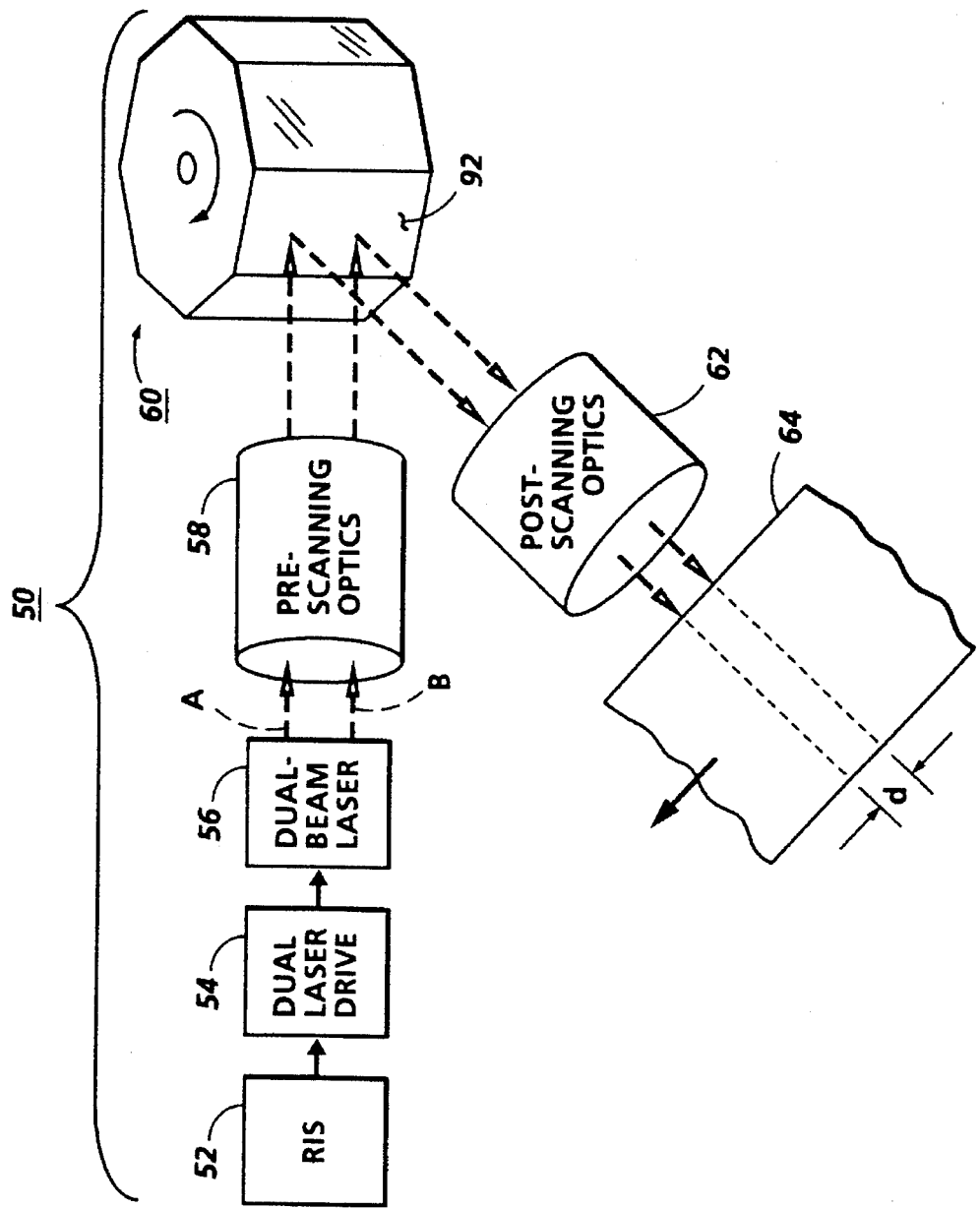
FIG. 1 is a block diagram illustrating a preferred multiple beam ROS embodiment for the present invention.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements. In describing the present invention, the following term(s) have been used in the description.

An "image" is a pattern of physical light. An "image output device" is a device that can provide output defining an image and includes, but is not limited to, the printer embodiment described herein. Data signals define an image when the data includes sufficient information to produce the image, such as by printing it. An image may include characters, words, and text as well as other features such as graphics. A "pixel" is the smallest segment of an image whose value is indicated in an item of data defining the image. A scan line is a plurality of pixels evenly spaced along a line or arc. A "raster" is a pattern of multiple scan lines arranged to evenly cover an area. In a raster output scanner a raster is formed by the periodic sweep or scan of a modulated light beam across a uniformly moving surface that is to be exposed.

FIG. 1 is a block diagram illustrating a preferred multiple beam ROS printer embodiment for the present invention. More specifically, ROS 50 may employ a dual-beam laser source in a 600×600 spot per inch (spi) imaging system. The system preferably has pulse-width, position-modulated addressability with n bits per pixel of grey level resolution. Specifically, dual laser driver 54 receives input image data streams from an image source such as a raster input scanner (RIS) or similar system suitable for the generation of high speed digital image data, including computers, facsimile scanners, and electronic networks. In response to the input signal streams, driver 54 modulates the light flux output of the individual beams (A and B) of multiple laser source 56. The multiple laser source may generally be selected from the group including solid state or semiconductor lasers, diode lasers, gas lasers, or liquid lasers, and may include associated modulation mechanisms, be they electrical, electromagnetic, polarization, acousto-optic, or electromechanical.

It should be noted that while illustrated as a dual-beam ROS for simplicity, optical system 50 is equally applicable to systems having three or more laser beams. It should also be noted that in the case of an odd number of lasers, the chief ray of the center laser beam would preferably be located on the sagittal optical axis.

Subsequently, the modulated output beams of dual beam laser 56 are conditioned and shaped by pre-scanning (prepolygon) optics 58 before being reflected from one of at least four facets of polygon 60. Although depicted as a mirror surface of a rotating multi-faceted polygon, facet 92 may be part of any well-known arrangement suitable for deflecting the beam across a sufficient scan arc, including galvanometer mirrors and micromodulator mechanisms. After reflection from the scanning facet 92, the dual-beams may again be shaped by well-known post-scanning (postpolygon) optics 62 before being scanned across the surface of photoreceptor 64 as a pair of exposing spots separated by distance d. In a preferred embodiment, the separation distance d is a function of the output resolution and the interlace factor of the ROS. For example, in a 600 line per inch (lpi) ROS with an interlace factor of 3 scanlines, the separation would be 1/200 of an inch.

In dual-beam laser 56, the laser emitters are vertically aligned into a column, and are preferably sagittally (vertically) offset by 25 microns or less. As illustrated in FIG. 1, beams A and B are preferably parallel so as to assure that the angle of incidence with respect to the facet 92 of polygon 60 is zero, or approaching zero. In order to achieve telecentricity between the dual beams impinging upon the surface of facet 92, the present invention employs a field lens device as an element in the pre-scanning optics 58.

Figure 2:
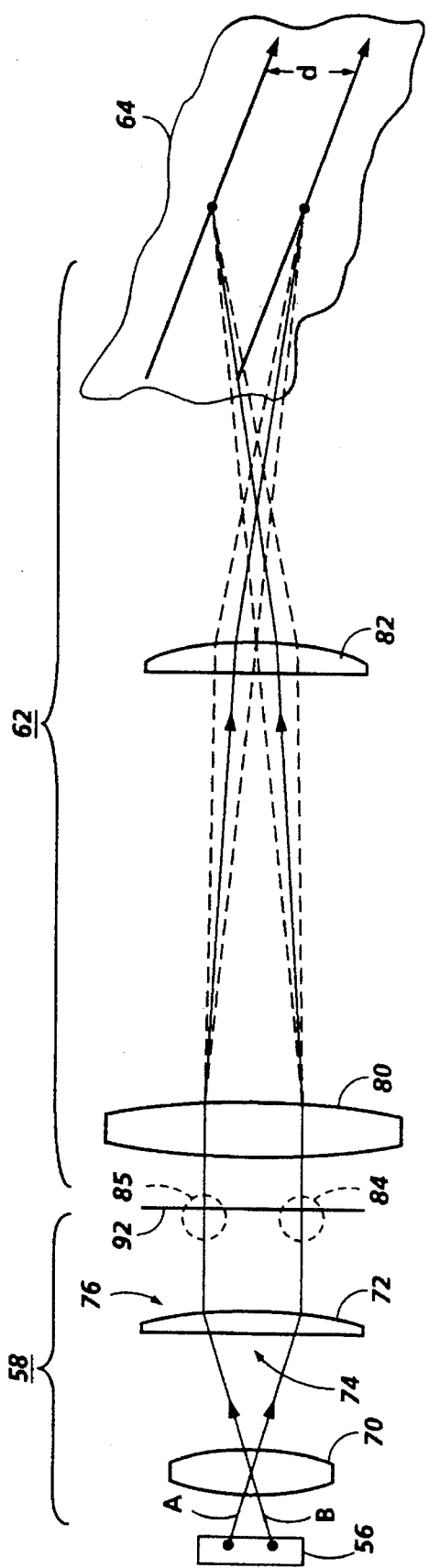
FIG. 2 is a sagittal view of an embodiment of the present invention.

Turning now to FIG. 2, pre-scanning optics 58 will be further described in accordance with the present invention. Once emitted from laser 56, beams A and B are first collimated by prepolygon collimator 70 which may be a single or multiple element device. Once collimated, beams A and B then pass through field lens device 72, which in one embodiment is a simple lens having a combination of refractive surfaces such as a planar front surface 74 and a spherical rear surface 76. More specifically, field lens 72 may be a weak cylindrical or spherical lens, preferably placed in the plane of the scanning polygon facet 92, with conjugates at infinity and at the effective center or principle point of the collimator 70. Other alternative embodiments for a single element field lens 72 include a weakly spherical front surface and a spherical rear surface, a planar front surface and a cylindrical rear surface, and a weakly cylindrical front surface and a cylindrical rear surface.

Figure 3:
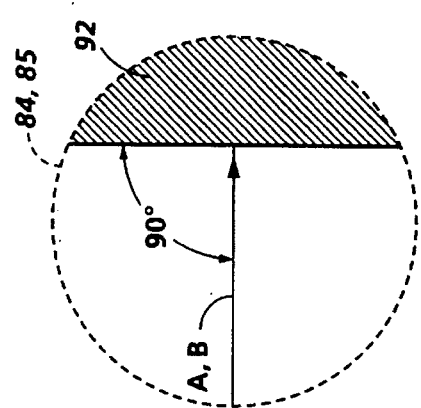
FIG. 3 is a detailed view of the angle at which a beam strikes the scanning surface in accordance with the present invention.

Placement of the field lens in such a fashion would render the beams all normal to the rotational axis of the facet without changing the beam wavefront characteristics or focal positions. Preferably, the angle of incidence of beams A and B will be 90°, within a fraction of a minute of arc (less than 0.1 arc minute) as illustrated in FIG. 3. However, in most ROS systems, placement of a field lens device in the plane of the scanning facet is impossible as it would interfere with the mechanical operation of the scanning facet. Accordingly, the preferred embodiment positions the field lens as close as possible, and directly in front of the scanning facet. In this position, the beams may still be rendered normal to the polygon facets by selecting the field lens conjugates in accordance with well-known optical design practices; it is understood that such modifications contribute to changes in magnification and optical power that must be included in the overall ROS optical design.

To further appreciate the function of field lens device 72, consider the following exemplary design parameters of a typical dual beam ROS system. Starting with laser diode sources spaced 25 microns (1 mil) apart, a typical ROS system optically enlarges the spacing to d=1/200 inch at the photoreceptor in two steps. The spacing is first magnified by a factor of about 1.6× and the beams are brought to line foci at the scanning mirror surface by the prepolygon optics 58. The postpolygon optics 62, comprising the F-Θ projection and WCO elements, further enlarge the spacing by a factor of about 3× and project scan lines on the photoreceptor surface separated by the distance d=1/200 inches. For most ROS scanners useful in electrophotographic applications, the post polygon projection distance is typically in the range of 14 to 18 inches, and the prepolygon optics has a total length of 6 to 9 inches. One reason for selecting long prepolygon conjugate distances is so that the difference in the incidence angle of the two beams striking the reflective facet is as small as practicable in order to minimize differential scan line bow. The 1.6× magnification factor means that the foci on the mirror facet are 25×1.6=40 microns apart at a conjugate distance of approximately 4.6 inches. Thus the two beams strike the mirror facet inclined at about ±0.3 minutes of arc from the normal which is typical for a conventional ROS system where the bow has been reduced to an acceptable level.

The present invention provides telecentric paths for multiple laser beams output from the prescanning optics so that each beam strikes the mirror facet at precisely normal incidence (within ±0.1 arc minutes or less). Furthermore, since the telecentric property does not rely on a long projection distance to minimize deviations from precisely normal incidence at the mirror facet, prepolygon optical train 58 can be redesigned with the same magnification factor and the same beam spot size, but much shorter overall physical length. In most ROS scanners intended for electrophotographic printers, compactness is an important design goal, especially in desk-top applications.

Those skilled in the art will appreciate that in other alternative embodiments the separate beams (A and B) may also be made normally incident on the polygon facet 92 by individually redirecting each beam with an appropriate optical prism (FIG. 4), Fresnel lens, mirror section, or diffraction grating (FIGS. 5 and 6) placed in its path. Taken together, the optical prism, mirror section, or diffraction grating redirection elements would form a field lens device 72 in the form of an optical mosaic considered to be a piecewise equivalent of a continuous refracting, reflecting, or diffracting surface, respectively. As used herein, the term mosaic represents a collection of optical elements individually optimized for each beam.

Figure 6:
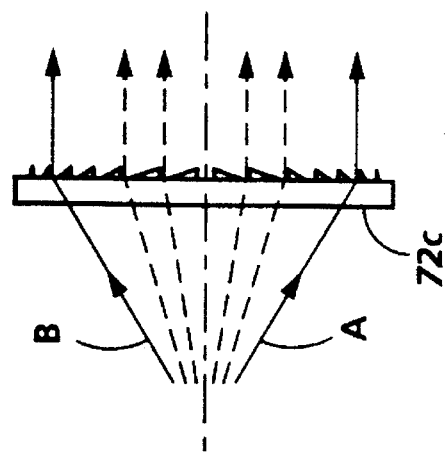
FIGS. 4, 5 and 6 are detailed illustrations of alternative embodiments for the field lens illustrated in FIG. 2.
Figure 5:
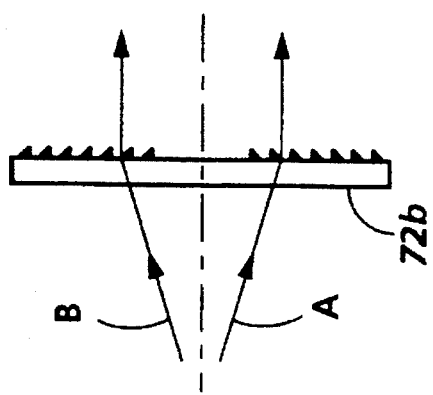
Figure 4:
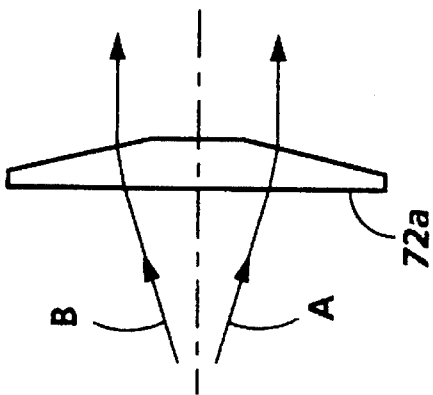

As illustrated in FIG. 4, for example, the desired function of the field lens device 72a can be accomplished with three individual prisms (or more for multiple beam systems with more than three beams. Similarly, as illustrated in FIGS. 5 and 6 telecentric alignment of the beams may also be accomplished with multiple diffraction gratings (the middle element has infinite spacing between lines) where the sections have been joined together or fabricated on a common substrate. As further illustrated by FIGS. 5 and 6, respectively, a diffraction field lens device 72b and 72c can be either a segmented or a continuous grating (the diffraction equivalent of a continuous lens curvature), produced using binary optic or holographic fabrication techniques well-known in the field of optical element fabrication.

It is further noted that the diffractive and refractive field lens devices may be combined to share the optical function of the field lens device while eliminating wavelength dependence of the diffraction element or glass lens alone. Such a combination may be preferred because the laser wavelengths shift slightly with power level and temperature. As the shift of glass is opposite that of a diffraction device, by combining the two the optical function of the field lens device can be made relatively insensitive to small changes in wavelength. However, such an embodiment would preferably minimize the color of the overall system (i.e., compensate for a diffraction element shift with the opposite shift of all the other glass parts combined, both pre- and post-scanning) so that it appeared that the diffraction field lens was "stand alone."

As a result of the various embodiments described above it will be understood that eliminating conical scans by employing a mosaic or equivalent telecentric field lens design is advantageous because each of the multiple beam paths intersects the cylindrical wobble correcting lens element WCO along a straight line at a fixed displacement from the scan plane. This employment of a field lens device can significantly reduce scan line curvature due to the WCO shape factor in the case where aspheric correction has not been included in the WCO design.

Figure 7:
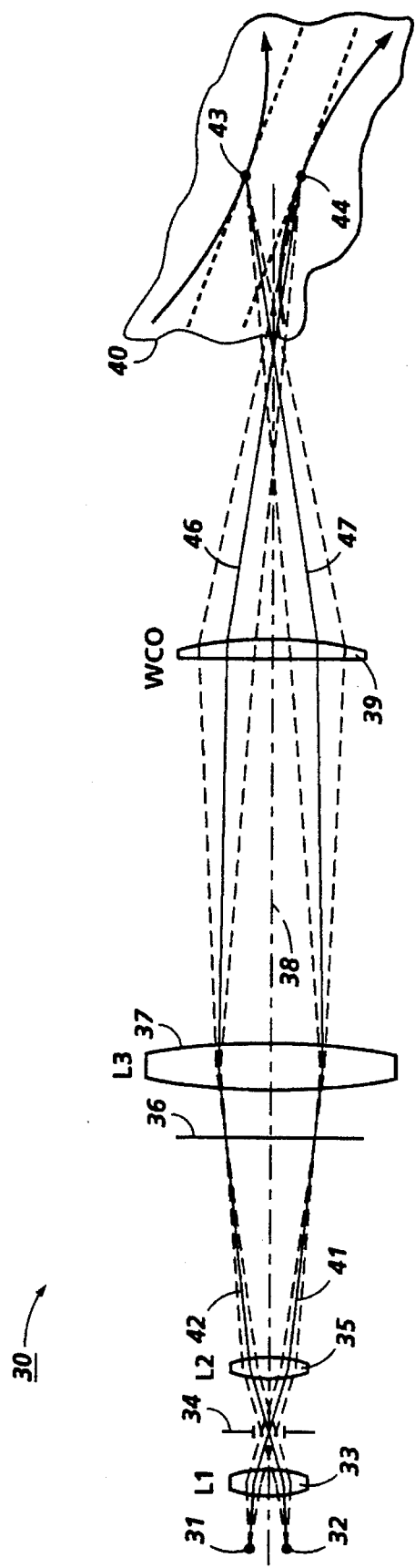
FIG. 7 is a sagittal view of a typical prior art multiple beam polygon optical system.

Upon passing through the rear surface 76 of field lens 72, beams A and B are telecentric, being parallel to the optical axis of the the ROS system and therefore equally perpendicular to the rotational axis of scanning facet 92, as illustrated by the detail of FIG. 3. Hence, the scanning beams sweep out a plane in the post-scanning space instead of the cone that results when the incident beams are not perpendicular to the scanning facet. Once processed by the post-scanning optical components including, for example, scan lens 80 and wobble cylinder lens (an WCO) 82, the resulting exposure paths are parallel on the surface of photoreceptor 64; as contrasted with the bowed paths illustrated in prior art FIG. 7. As depicted, in FIG. 2, the scan paths traced by beams A and B are separated by a distance d. A specific line separation distance d will be dependent upon the interlace factor desired for the scanlines. It will be further appreciated that additional optical components may be included in both the pre- and post-scanning optics to achieve other requirements of the raster output scanning system.

In recapitulation, the present invention is an apparatus for eliminating differential scanline bow in a raster output scanner printing system. The apparatus employs a field lens device at the output of a prescanning optical assembly in order to direct the laser beams toward the scanning surface, or facet, at a right angle to the scanning surface, thereby eliminating a source of differential scanline bow.

It is, therefore, apparent that there has been provided, in accordance with the present invention, a method and apparatus for reducing differential scanline bow in a ROS imaging system. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

I claim:

1. A raster output scanner for a printing apparatus, comprising:

a multiple beam light source having at least two emitters for emitting a plurality of light beams, said emitters being separated from one another in the sagittal direction by a maximum of 25 microns;

a photoreceptor;

a movable beam reflecting device for scanning each of the plurality of light beams along the photoreceptor;

a pre-scanning optical system for collimating the plurality of light beams and providing the collimated light beam at an angle of incidence normal to an axis of rotation for said reflecting device and at a separation of at least 40 microns, said pre-scan optical system including a collimator and a field lens device immediately adjacent said movable beam reflecting device so as to be the last element in said pre-scanning optical system, wherein said field lens device has a first conjugate distance equal to the distance between the optical center of the collimator and the field lens device and a second conjugate of infinity; and a post-scanning optical system for focusing the light beams onto the photoreceptor at a separation of at least 127 microns.

2. The raster output scanner of claim 1, wherein each of the plurality of light beams are aligned to so as to be incident upon a surface of the reflecting device at an angle of at least 89 degrees 59.9 arc minutes and less than 90 degrees 0.1 arc minute.

3. The raster output scanner of claim 1, wherein said beam reflecting device is a galvanometer having a reflecting surface that is pivotable about the axis of rotation.

4. The raster output scanner of claim 1, wherein said beam reflecting device is a rotating polygon having a plurality of reflective facets rotating about the axis of rotation.

5. The raster output scanner of claim 4, wherein the rotating polygon has at least four facets.

6. The raster output scanner of claim 1, wherein the light beams emitted by the multiple beam light source form interlaced scan lines on the photoreceptor.

7. The raster output scanner of claim 1, wherein the multiple beam light source is selected from the group consisting of:

a solid state laser;

a diode laser;

a gas laser;

a liquid laser; and a semiconductor laser.

8. The raster output scanner of claim 1 wherein said field lens device comprises a single element lens.

9. The raster output scanner of claim 8 wherein said single element lens includes:

a planar front surface; and a cylindrical rear surface.

10. The raster output scanner of claim 8 wherein said field lens device consists essentially of an optical mosaic comprising at least one optical element for each of the plurality of light beams, wherein said optical elements are selected from the group consisting of:

an optical prism;

and a diffraction grating.

11. The raster output scanner of claim 1 wherein said single element lens includes:

a planar front surface; and a spherical rear surface.

12. The raster output scanner of claim 1 wherein said single element lens includes:

a spherical front surface; and a spherical rear surface.

13. The raster output scanner of claim 1 wherein said single element lens includes:

a cylindrical front surface; and a cylindrical rear surface.

14. The raster output scanner of claim 1 wherein said field lens device consists essentially of a lens including at least two refractive surfaces.

15. The raster output scanner of claim 1 wherein said field lens device consists essentially of a diffractive element.

16. The raster output scanner of claim 1 wherein said field lens device consists essentially of a diffractive element in combination with a lens so as to reduce any light beam wavelength dependence of the raster output scanner.

* * * * *